United States Patent
Hwang et al.

(10) Patent No.: US 7,062,144 B2
(45) Date of Patent: Jun. 13, 2006

(54) ARCHITECTURE OF CONNECTING OPTICAL PCB, TRANSCEIVER MODULES FOR OPTICAL PCB AND OPTICAL CONNECTION BLOCK

(75) Inventors: Sung Hwan Hwang, Daejeon (KR); Han Seo Cho, Daejeon (KR); Mu Hee Cho, Daejeon (KR); Hyo-Hoon Park, Daejeon (KR)

(73) Assignee: Infomation and Communications University Research and Industrial Cooperation Group, Daejeon (KR)

( * ) Notice: Subject to any disclaimer, the term of this patent is extended or adjusted under 35 U.S.C. 154(b) by 0 days.

(21) Appl. No.: 11/067,708

(22) Filed: Mar. 1, 2005

(65) Prior Publication Data

US 2006/0056765 A1   Mar. 16, 2006

(30) Foreign Application Priority Data

Sep. 10, 2004   (KR) ............... 10-2004-0072673

(51) Int. Cl.
  *G02B 6/00*   (2006.01)
(52) U.S. Cl. .................................. 385/139; 385/14
(58) Field of Classification Search ............. 385/139
  See application file for complete search history.

(56) References Cited

U.S. PATENT DOCUMENTS

| | | | |
|---|---|---|---|
| 5,195,154 A * | 3/1993 | Uchida ................ | 385/88 |
| 5,521,992 A * | 5/1996 | Chun et al. ........... | 385/14 |
| 6,257,771 B1 | 7/2001 | Okayasu ............... | 385/89 |
| 6,285,808 B1 | 9/2001 | Mehihorn et al. ..... | 385/14 |
| 6,324,328 B1 | 11/2001 | Mehihorn et al. ..... | 385/131 |
| 6,370,292 B1 | 4/2002 | Strake ................ | 385/14 |
| 6,389,202 B1 | 5/2002 | Delpiano et al. ..... | 385/49 |
| 6,396,968 B1 | 5/2002 | Pillkahn .............. | 385/14 |
| 6,512,861 B1 | 1/2003 | Chakravorty et al. .. | 385/14 |
| 6,516,105 B1 | 2/2003 | Khusid et al. ......... | 385/15 |
| 6,869,229 B1 * | 3/2005 | Reedy et al. .......... | 385/88 |
| 6,910,812 B1 * | 6/2005 | Pommer et al. ........ | 385/92 |
| 2005/0100264 A1 * | 5/2005 | Kim et al. ............ | 385/14 |

FOREIGN PATENT DOCUMENTS

JP   2001-356245   * 12/2001

OTHER PUBLICATIONS

U.S. Appl. No. 11/052,828, to Lee et al., which was filed on Feb. 9, 2005.

* cited by examiner

*Primary Examiner*—Ellen E. Kim
(74) *Attorney, Agent, or Firm*—Greenblum & Bernstein, P.L.C.

(57) ABSTRACT

Disclosed herein is an architecture of connecting a transceiver module for an optical PCB, in which an active photo-electric element and other components to be integrated in the optical PCB having waveguides are packaged, waveguides arranged in the optical PCB, and an optical connection block for optical coupling between the transceiver module and the waveguides of the optical PCB. Guide pin insertion holes are formed at one sides of the ends of the waveguides such that the optical PCB, the transceiver module and the optical connection block can be passively aligned using guide pins inserted into the guide pin insertion holes.

9 Claims, 12 Drawing Sheets

[Fig. 1a]
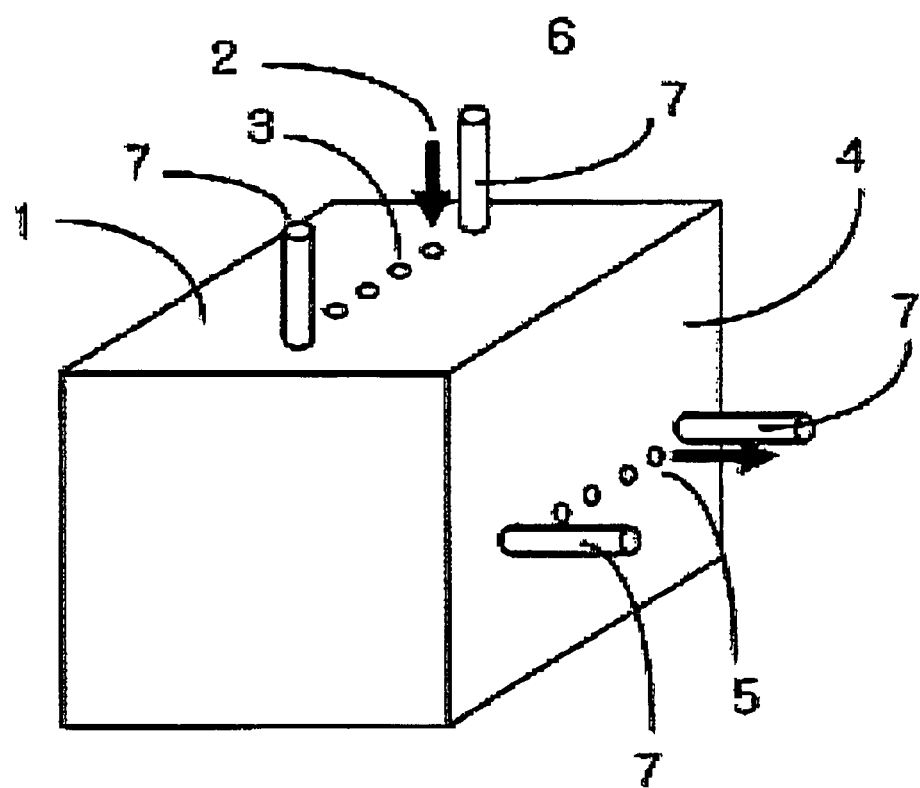

[Fig. 1b]
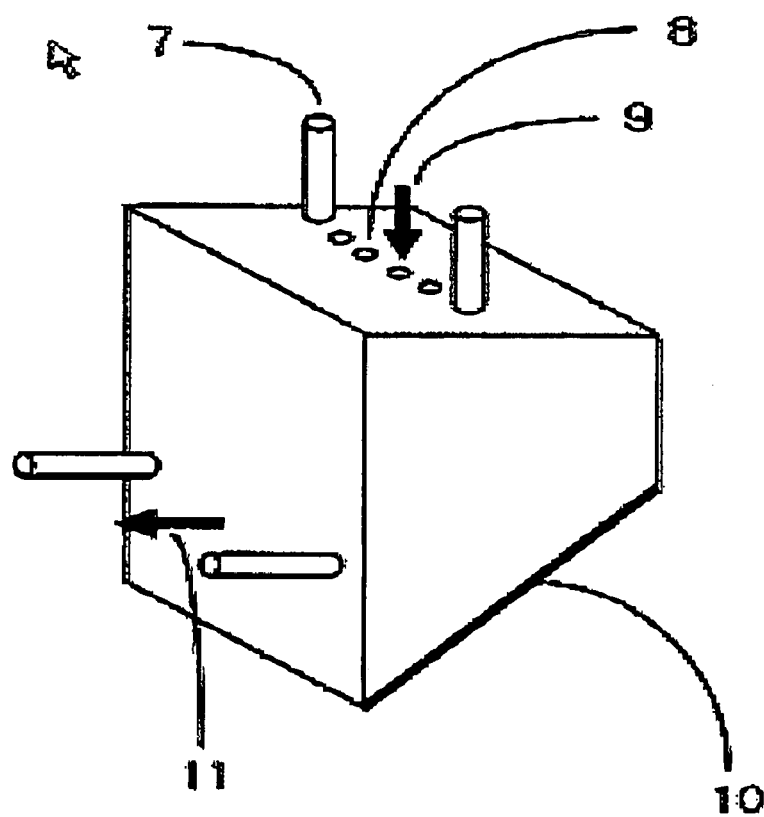

[Fig. 2]
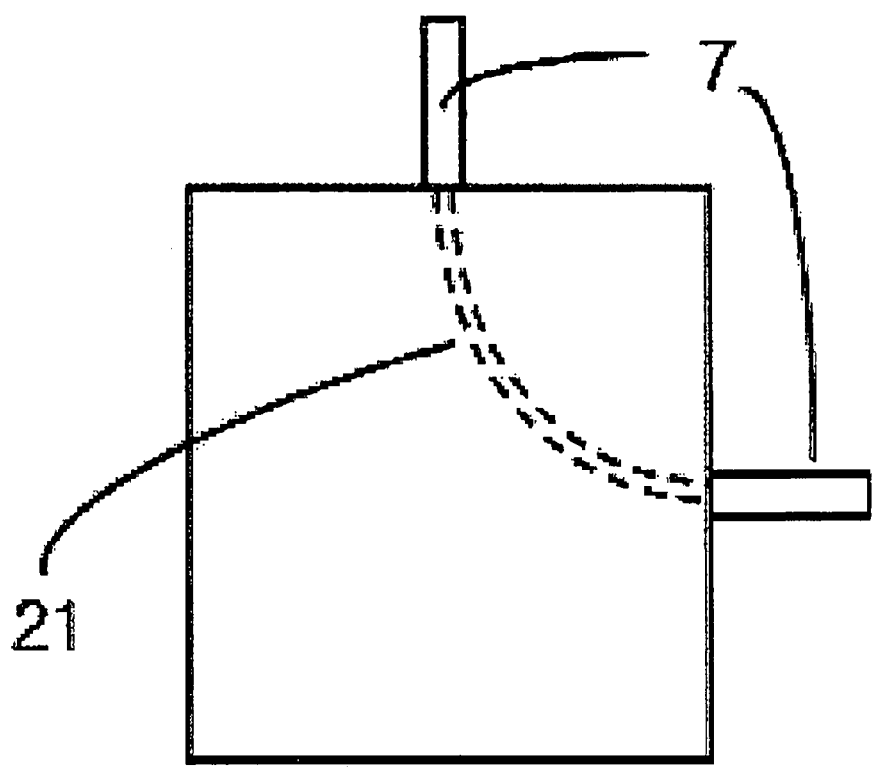

[Fig. 3]
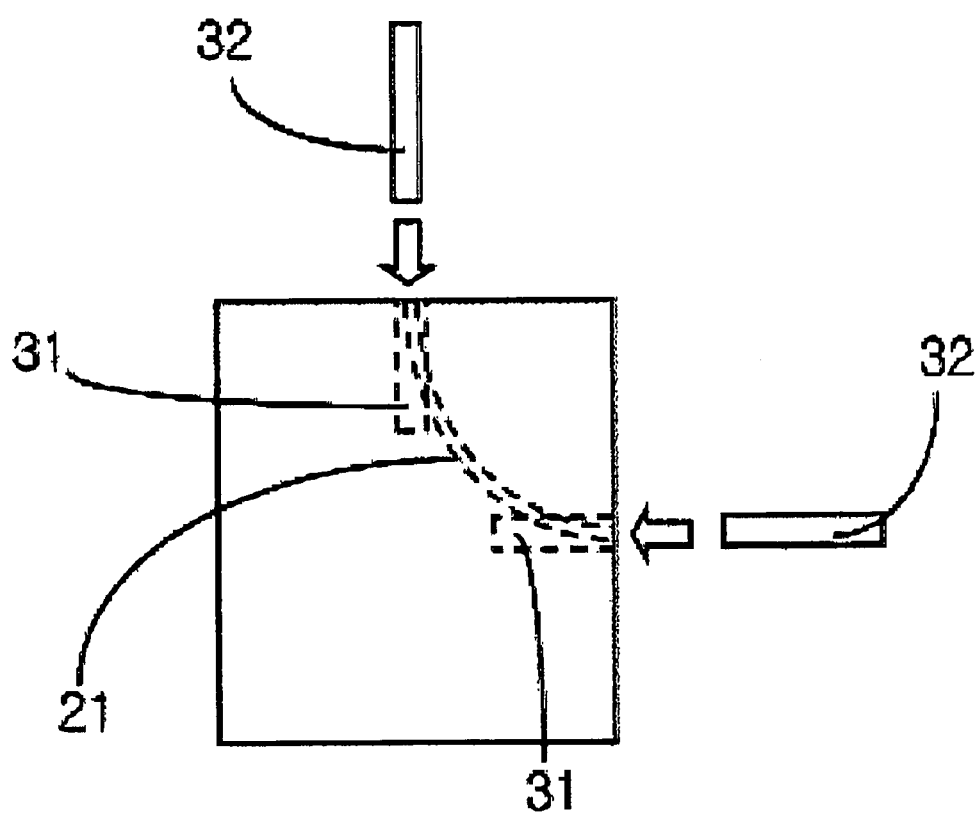

[Fig. 4]
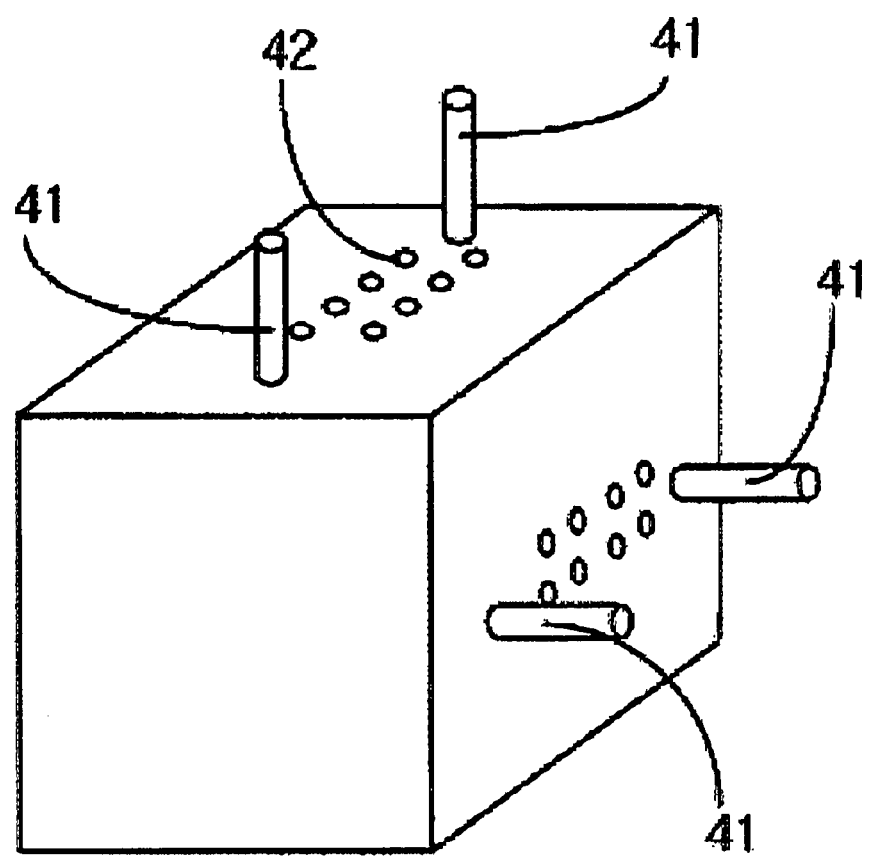

[Fig. 5]
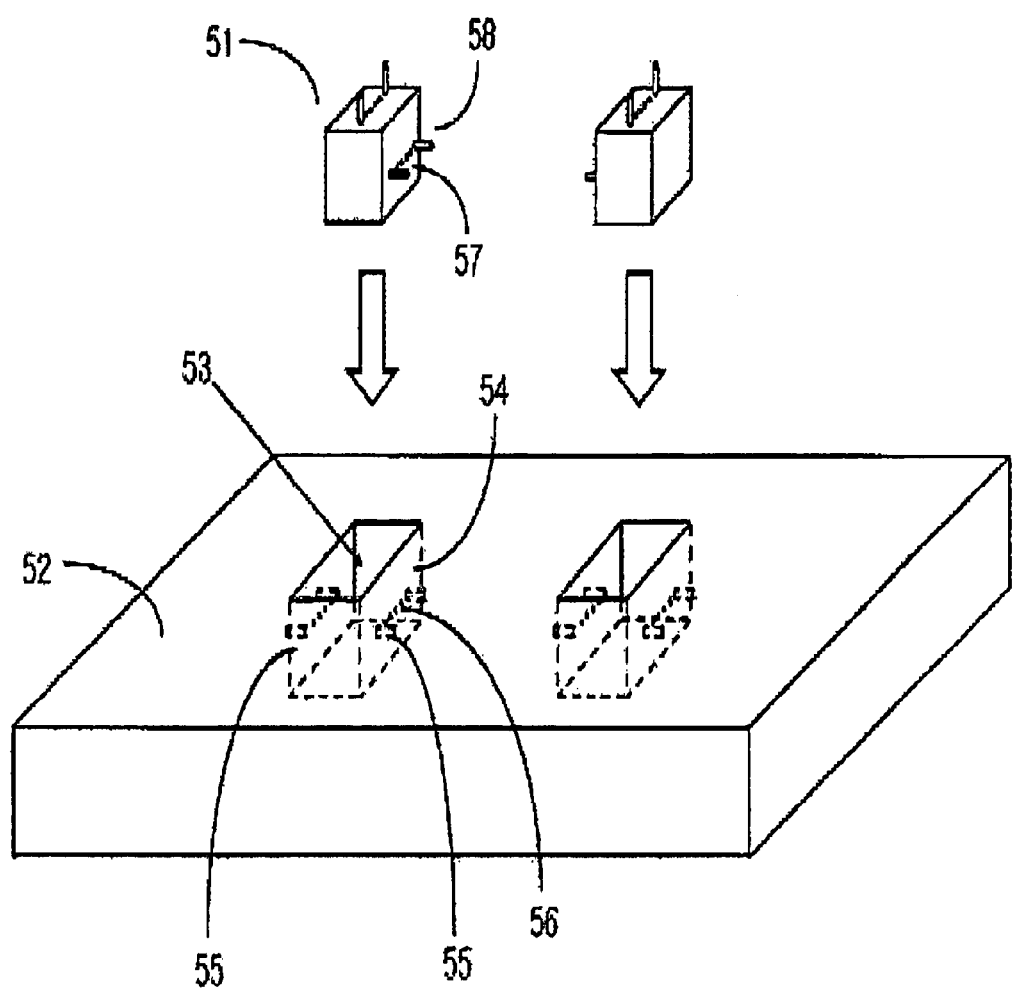

[Fig. 6]
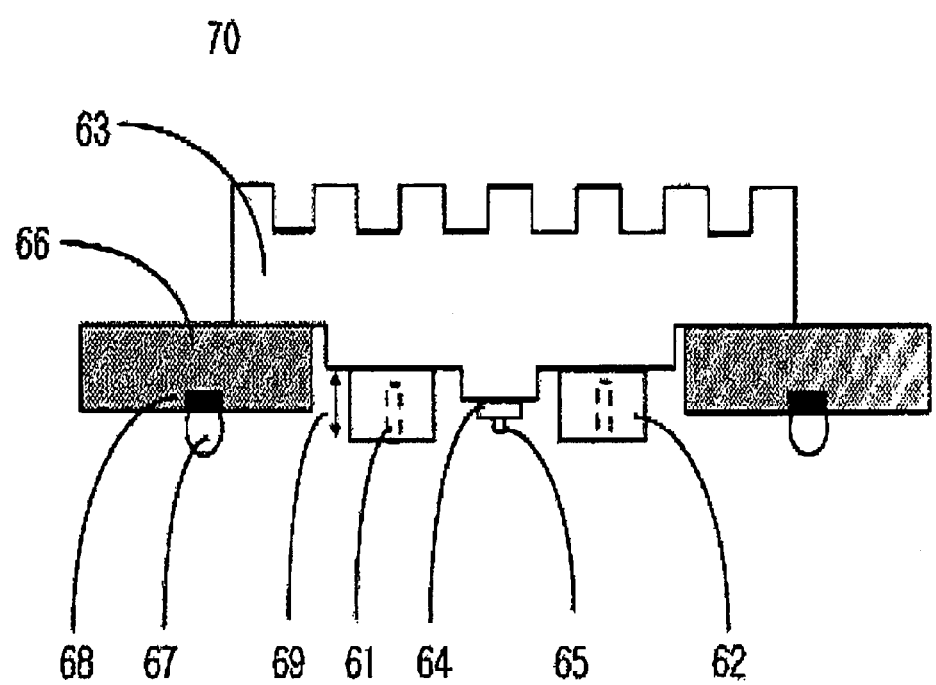

[Fig. 7]
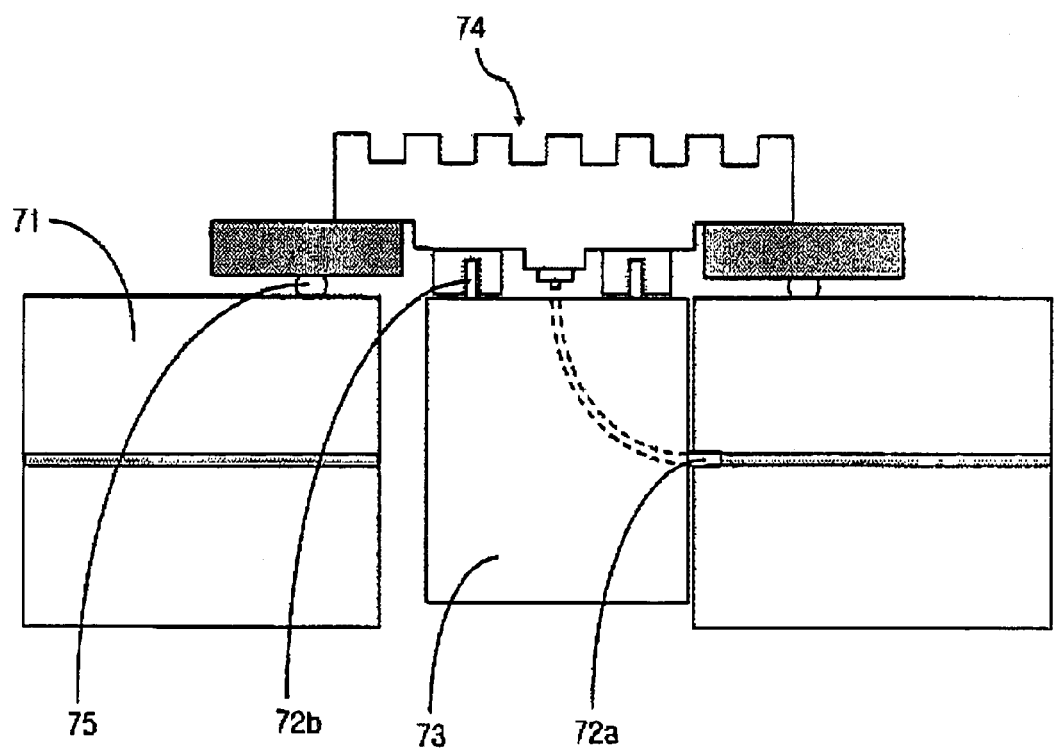

[Fig. 8]
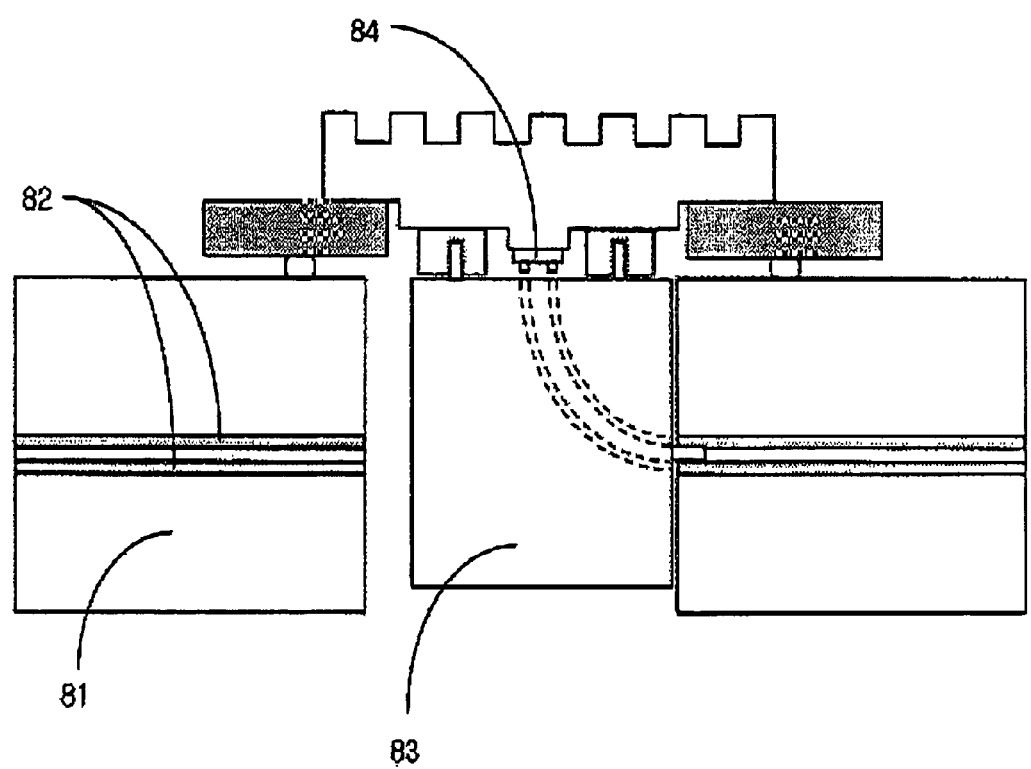

[Fig. 9]
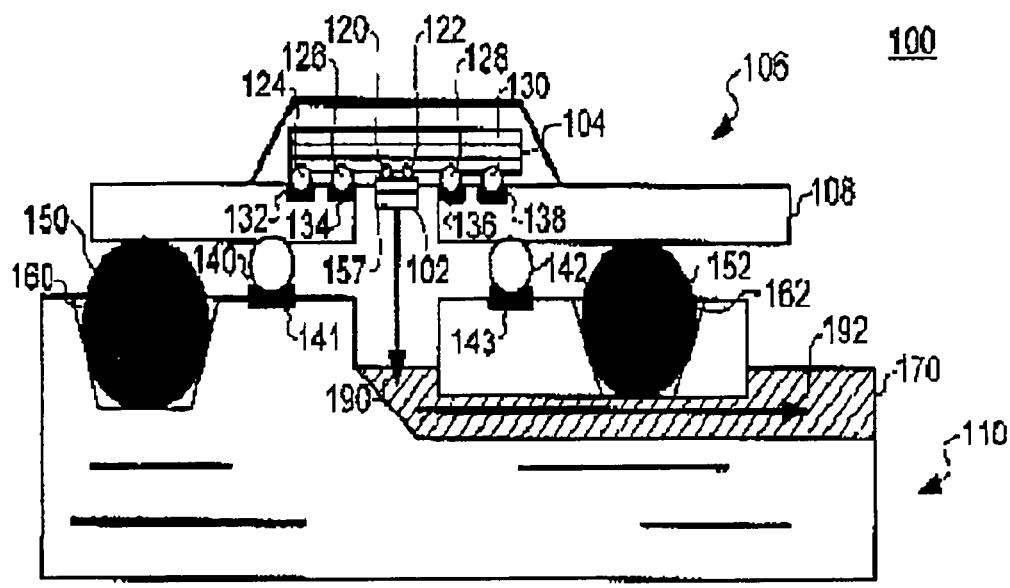

[Fig. 10]
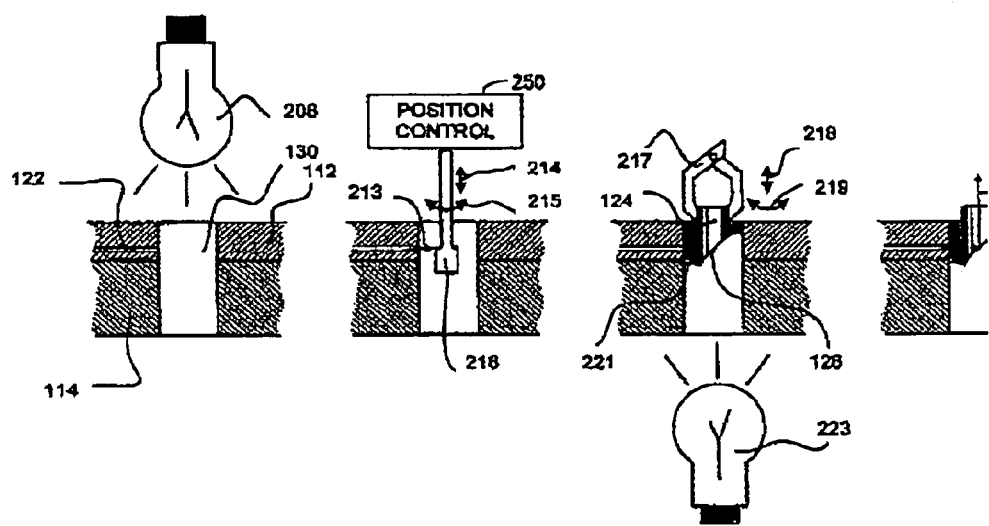

[Fig. 11]
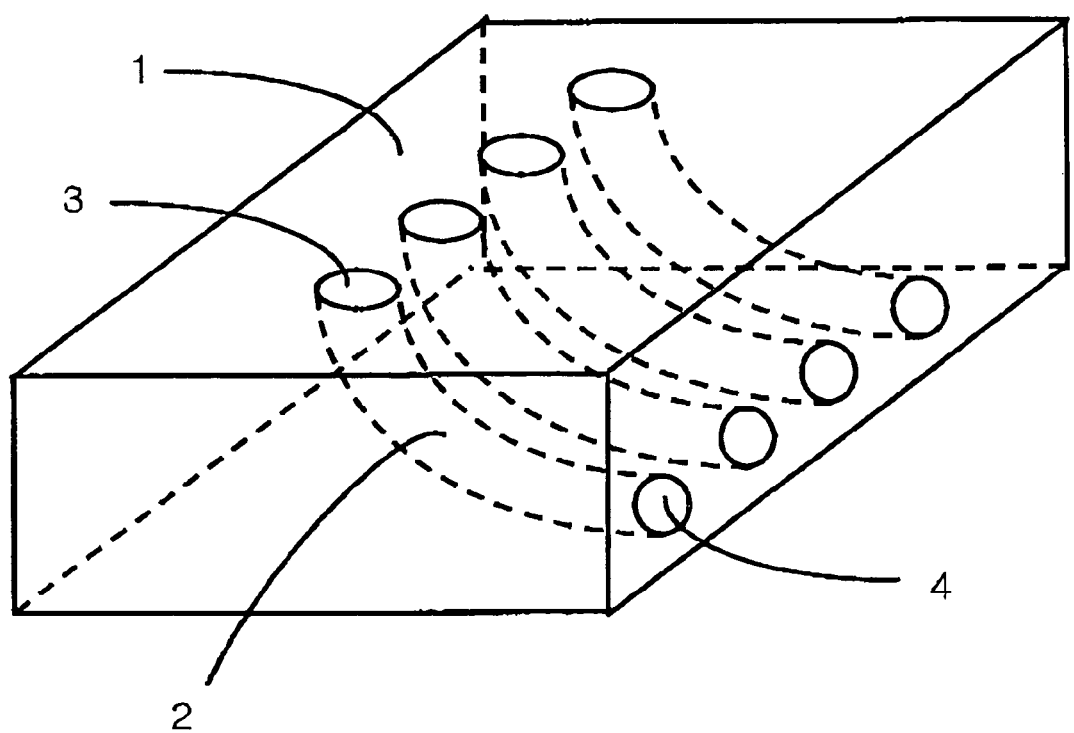

ARCHITECTURE OF CONNECTING OPTICAL PCB, TRANSCEIVER MODULES FOR OPTICAL PCB AND OPTICAL CONNECTION BLOCK

BACKGROUND OF THE INVENTION

1. Field of the Invention

The present invention relates to an optical PCB, a module for the optical PCB and an optical connection block, and more particularly, to an architecture of connecting an optical PCB, a transceiver modules for the optical PCB, and an optical connection block for passively aligning the optical connection block for optical coupling between the transceiver module and waveguides mounted in the optical PCB.

2. Background of the Related Art

With the development of IC (Integrated Circuit) technology and improvement of operating speed and integration scale of ICs, the performance of microprocessors and capacity of memory chips are rapidly increased. Accordingly, next-generation information communication systems constructed of large-capacity parallel computers or ATM (Asynchronous Transfer Mode) switching systems of terabit (Tb/s) grade, which transfer a vast quantity of information at a high speed, require improved signal processing capability. Accordingly, an increase in signal transmission speed and density of wires is needed.

However, conventional devices have limitations in increasing signal transmission speed and density of wires because information transfer in a short distance, such as between boards or between chips, is carried out using electric signals. Furthermore, the resistance of wires causes signal delay in the conventional devices. Moreover, an increase in signal transmission speed and wire density generates noises caused by electromagnetic interference and thus countermeasures against the noises are needed.

To solve this problem, a waveguide capable of transmitting and receiving optical signals using a polymer and a glass fiber has been recently imbedded into a PCB, which is called EOCB (Electro-Optical Circuit Board). The EOCB handles both of electric signals and optical signals and performs super high-speed data communication using optical signals in the same board. The waveguide and a glass substrate are imbedded in the PCB when a copper circuit pattern is formed such that data can be converted into electric signals to be stored/processed in a device.

Optical lines can be applied to connection of devices, connection of boards, or connection of chips. Particularly, the optical lines are suitable for constructing optical transmission communication systems for signal transmission in relatively short distance, such as between a chip and another chip.

Conventional EOCBs include a transmission silicon chip, a light-emitting unit, an optical substrate, a photo-detecting unit, and a receiving silicon chip, which are formed on a silicon substrates, and use a lens for optical coupling. However, This construction cannot be classified as an optical backplane, which is a modified form of an optical transceiver module and is applied to a general PCB to solve electrical connection problems.

An example of conventional optical backplanes is disclosed in U.S. Pat. No. 6,324,328, entitled "Circuit carrier with integrated, active, optical functions", in which a waveguide is used as an optical line for transferring signals and placed in a PCB.

Another example is a configuration in which a surface-emitting laser and a photodiode are sealed in a hole formed in the backside of a plastic BGA package and two polymer micro-lenses are arranged on a single optical path, to extend packaging tolerance. This configuration enables parallel transmission of optical signals between IC packages and remarkably reduces packaging cost. However, this technique is difficult to use because of three alignment errors, that is, an error generated when a waveguide is placed in a PCB, an error generated when the surface-emitting laser is attached to the backside of the plastic BGA, and an error generated caused by secondary internal connection when the plastic BGA is soldered to the PCB. Furthermore, it cannot spread or cool down heat emitted from the chip because the surface-emitting laser has a completely closed structure.

An example of conventional modules for optical PCBs is U.S. Pat. No. 6,512,861. Referring to FIG. 9, a bottom emitting or sensing active photo-electric element 102 is flip-chip-bonded to a transmission or receiving chip 104 using solder bumps 120 and 122. In addition, the transmission or receiving chip 104 is also flip-chip-bonded to a BGA package substrate 108 and integrated on a printed circuit board 110 having an alignment ball placed in a V-groove 160 to facilitate the alignment of a BGA package.

Another example of the conventional modules for optical PCBs is disclosed in U.S. Pat. No. 6,396,968, in which an active photo-electric element is mounted on an electric PCB and vertically installed in the PCB such that the active photo-electric element is directly connected to an optical waveguide placed in the PCB.

In the meantime, a function of reflecting optical signals orthogonally for optical-coupling an active photo-electric element integrated in an optical PCB and a waveguide located in the optical PCB is required in optical configurations other than the configuration in which the active photo-electric element is directly connected to the optical waveguide arranged in the PCB. For this, methods of forming a mirror face in a structure in which the end of an optical waveguide or optical fiber mounted on an optical PCB is tilted at 45° are proposed, which are disclosed in U.S. Pat. No. 6,257,771 and U.S. Pat. No. 6,389,202.

Furthermore, a technique of inserting an optical connection block having a reflecting face (or reflecting system) into a groove formed in a PCB and integrating active photo-electric elements thereon to reflect lights orthogonally is used. This technique is disclosed in U.S. Pat. No. 6,285,808 and U.S. Pat. No. 6,370,292.

In the meantime, U.S. Pat. No. 6,516,105 B1, entitled "Optical backplane assembly and method of making same", discloses a method of aligning an optical backplane on a motherboard. Referring to FIG. 10, a fluorescent material 122 reacting to UV rays is coated on an optical layer in an optical PCB. Then, UV rays 208 are irradiated to one side of the fluorescent layer 122 and light emitted from the fluorescent layer is detected by a detector 216 at the other side of the fluorescent layer, to fix an optical connection component 124 to the light-emitting position.

Furthermore, an optical connection block, as shown in FIG. 11, is constructed in such a manner that optical fibers are curved at a right angle inside a hexahedron block to transfer light input from the top surface of the block to the side of the block.

For optical coupling between chips based on an optical PCB, sufficiently high optical coupling efficiency must be maintained by aligning an optical PCB in which optical waveguides are mounted, a transceiver modules for the optical PCB in which active photo-electric elements are integrated, and an optical connection block serving as an optical signal paths between the transceiver module and the optical PCB with high accuracy. Furthermore, complete passive alignment is required because active alignment increases packaging cost. A conventional technique that mounts active photo-electric elements in through-holes of a BGA substrate and then integrates BGA packaging in a PCB using a solder ball, which is disclosed in U.S. Pat. No. 6,512,861, can passively align an optical PCB with a transceiver modules for the optical PCB according to self-alignment of the solder ball. However, this technique cannot align the optical PCB and the optical connection block or the transceiver module for the optical PCB and the optical connection blocks passively.

The method of aligning the optical backplane on the motherboard, disclosed in U.S. Pat. No. 6,516,105, detects light emitted from the fluorescent material with a detector using an active method, and then moves the optical connection block to the position of the detector. However, this technique requires a separate process to increase operating time. Furthermore, alignment of the optical connection block can be deviated while the optical connection block is moved.

Moreover, the aforementioned structure in which the optical fibers are curved at a right angle in the hexahedron block to transfer light input from the top surface of the block to the side of the block has a difficulty in passive alignment of the block with an optical PCB or a transceiver module for the optical PCB.

The above-described complicated process for overcoming alignment problems increases the manufacturing cost of optical backplane over general PCBs.

SUMMARY OF THE INVENTION

Accordingly, the present invention has been made in view of the above problems occurring in the prior art, and it is an object of the present invention is to provide an architecture of connecting an optical PCB, a transceiver module for the optical PCB, and an optical connection block, which can passively align the optical PCB, the transceiver for the optical PCB, and the optical connection block and can be applied to both optical coupling between boards and optical coupling between chips since its miniaturization is possible.

To accomplish the object of the present invention, there is provided an architecture of connecting an optical PCB, a transceiver module for the optical PCB, and an optical connection block including waveguides that change the direction of optical signals by 90° for optical coupling between the optical PCB and transceiver module, wherein guide pins are disposed on a top surface and a side of the optical connection block and located spaced apart by a predetermined distance from the ends of the waveguides; wherein a rectangular groove is formed in the optical PCB having waveguides arranged therein, for inserting the optical connection block thereto; wherein guide pin insertion holes b are formed at one sides of the ends of the waveguides exposed from the side of the rectangular groove such that the guide pins disposed on the side surface of the optical connection block can be inserted into the guide pin insertion holes b; and wherein guide pin insertion holes c are formed in spacers located at one sides of an active photo-electric element of the transceiver module for the optical PCB such that the guide pins disposed on the top surface of the optical connection block can be inserted into the guide pin insertion holes c, whereby the guide pins are inserted into the guide pin insertion holes b and c to connect the optical PCB, the transceiver module and the optical connection block to one another.

The optical connection block can include guide pin insertion holes a such that the guide pins may be combined with and separated from the optical connection block through the guide pin insertion holes a. There are at least two guide pins and guide insertion holes b and c. The guide pins can have a shape of pole having any one selected from a group of cross sections of a circle, a square, a pentagon and a hexagon. The shapes of the guide pin insertion holes a, b and c conform to those of the guide pins.

Optical fiber or polymer waveguides in the optical PCB, optical fiber or polymer waveguides in the optical connection block, and active photo-electric elements integrated in the transceiver module for the optical PCB are respectively arranged in at least two layers.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 1A and 1B show optical connection blocks according to an embodiment of the present invention;

FIG. 2 is a cross-sectional view of the optical connection block shown in FIG. 1A;

FIG. 3 is a cross-sectional view of an optical connection block according to another embodiment of the present invention;

FIG. 4 is a perspective view of an optical connection block including two-layer waveguides;

FIG. 5 shows a configuration in which the optical connection blocks according to the present invention are mounted in an optical PCB;

FIG. 6 shows a transceiver module for an optical PCB, which can be passively aligned with the optical connection block according to the present invention;

FIG. 7 shows an architecture of connecting an optical PCB, an optical connection block having guide pins, and a transceiver module for the optical PCB;

FIG. 8 shows an architecture of connecting an optical PCB including two optical transmission layers, an optical connection block including guide pins and two-layer optical fibers or polymer waveguides, and a transceiver module including at least two-layer active photo-electric elements having active windows; and FIGS. 9, 10 and 11 show conventional optical PCBs.

DETAILED DESCRIPTION OF THE PREFERRED EMBODIMENT

Reference will now be made in detail to the preferred embodiments of the present invention, examples of which are illustrated in the accompanying drawings.

FIG. 1A is a perspective view of an optical connection block 6 according to an embodiment of the present invention. Referring to FIG. 1A, the optical connection block 6 changes the direction of incident light by 90°. Input holes 3 corresponding to the ends of waveguides arranged inside the optical connection block 6, into which optical signals 2 of multiple channels are input, are formed in the top surface 1 of the optical connection block 6. In addition, output holes 5 corresponding to the side ends of the waveguides, through which the optical signals 2 are output, are formed in the side surface 4 of the block. The waveguides are composed of optical fibers 21 or polymer connecting the input holes 3 to the output holes 5 and curved at a right angle, as shown in FIG. 2. The optical signals 2 are input into the input holes 3 and guided along the optical fiber or polymer waveguides curved at a right angle to be output through the output holes 5 formed in the side surface 4 of the optical connection block 6.

The optical connection block 6 is connected such that a transceiver module for an optical PCB and the optical PCB are optical-coupled. For the purpose of passively aligning the optical PCB and transceiver module with the optical connection block 6, guide pins 7 are provided on a top surface and a side surface of the optical connection block in such a manner as to be placed at one sides of the input holes 3 and output holes 5.

The configuration of the optical connection block except the guide pins is similar to the conventional "optical connection architecture using an optical fiber coupling block and an optical PCB". Although FIG. 1A shows two guide pins disposed at both sides of the input holes 3 and two guide pins disposed at both sides of the output holes 5 for convenience, the number of the guide pins is not limited thereto. Furthermore, the guide pins 7 can have a cylindrical shape or a rectangular pole shape.

FIG. 1B shows an optical connection block constructed such that optical signals 9 input to input holes 8 formed in the top surface of the block is reflected from a 45° reflecting surface 10 in a direction orthogonal to the top surface and output through output holes 11. Guide pins 7 are disposed at one sides of the input holes 8 and output holes 11 for passive alignment of the optical connection block with the optical PCB and transceiver module for the optical PCB. Reference numeral 9 represents an input optical signal and 11 denotes an output optical signal.

FIG. 2 shows that the optical fiber or polymer waveguide array 21 is curved at a right angle while maintaining a specific curvature inside the optical connection block shown in FIG. 1A.

FIG. 3 is a cross-sectional view of an optical connection block according to another embodiment of the present invention. In this optical connection block, guide pin insertion holes 31 are formed on one sides of the input holes and the output holes such that separate guide pins 32 are inserted into the guide pin insertion holes 31 when the optical connection block is aligned with an optical PCB or a transceiver for the optical PCB, distinguished from the optical connection blocks of FIGS. 1A and 1B in which the guide pins 7 are fixed to the optical connection blocks.

FIG. 4 shows the configuration of an optical connection block having 2-layer input and output holes 42 that expose an optical fiber or polymer waveguide array curved at a right angle while maintaining a specific curvature and arranged inside the optical connection block. That is, waveguides can be arranged in multiple layers.

FIG. 5 roughly shows a construction of mounting optical connection blocks 51 including guide pins 58 in an optical PCB 52. Referring to FIG. 5, the optical PCB 52 in which optical fiber or polymer waveguides, which are optical transfer layers, are arranged has rectangular grooves 53 such that the optical connection blocks 51 are respectively inserted into the grooves 53. Guide pin insertion holes b 55 into which the guide pins 58 of the optical connection blocks can be inserted are formed in the sides of the grooves 53. The guide pin insertion holes b 55 are located at both sides of input holes 56 exposing the optical fiber or polymer waveguides. The shape of the guide pin insertion holes b 55 conforms to the shape of the guide pins 58. That is, the guide pin insertion holes 55 have a shape of rectangular groove or cylindrical groove. The guide pin insertion holes b 55 are located at the positions corresponding to the guide pins 58 of the optical connection blocks 51 that have been inserted into the rectangular grooves 53 of the optical PCB 52. That is, the guide pin insertion holes 55 are positioned at one sides of the input holes 56 exposing the ends of the optical fiber or polymer waveguides arranged inside the optical PCB 52. Accordingly, output holes 57 formed in the side surfaces of the optical connection blocks 51 are aligned with the input holes 56 exposing the ends of the optical fiber or polymer waveguides arranged inside the optical PCB 52.

FIG. 6 is a cross-sectional view of a transceiver module 70 for an optical PCB, which can be passively aligned with the optical connection block having the guide pins according to the present invention. Referring to FIG. 6, the transceiver module 70 is constructed in such a manner that a heat spreader 63 on which an active photo-electric element 64 is mounted is inserted into a through-hole of a BGA substrate 66. The active photo-electric element 64 is attached to the center of the heat spreader 63 and includes an active window 65. Spacers 62 are fixed to the bottom side of the heat spreader 63 to emit heat generated from the active photo-electric element. Metal pads 68 on which solder balls 67 are placed are formed on predetermined portions of the BGA substrate 66.

The spacers 62 respectively include guide pin insertion holes c 61 into which the guide pins 58 of the optical connection block 51 can be inserted. The spacers 62 are as high as the active photo-electric element 64 does not come into contact with the optical connection block 51 when the transceiver module 70 and the optical connection block 51 are aligned with each other according to the guide pins 58 and the transceiver module 70 can be integrated in an optical PCB according to the solder balls 67.

The guide pin insertion holes c 61 formed in the spacers 62 are located at positions corresponding to the guide pins 62 of the optical connection block such that the active window 65 of the active photo-electric element 64 corresponds to the input holes formed in the top surface of the optical connection block. That is, the guide pin insertion holes c 61 are formed in the spacers 62 located spaced apart by a predetermined distance from the active window 65 of the active photo-electric element 64 such as a surface-emitting laser or a photodiode. Thus, the active window 65 of the active photo-electric element 64 corresponds to the input holes formed in the top surface of the optical connection block 51. Furthermore, the active photo-electric element 64 is located spaced apart by a predetermined distance from the metal pads 68 on which the solder balls 67 are placed.

The spacers 62 have a height 69 as high as the active photo-electric element 64 does not come into contact with the optical connection block 51 when the transceiver module 70 and the optical connection block 51 are aligned with each other according to the guide pins 58 and the transceiver module 70 can be integrated on an optical PCB according to the solder balls 67.

FIG. 7 shows an architecture of connecting an optical PCB 71, an optical connection block 73 having guide pins 72a, and a transceiver module 74 for the optical PCB. Referring to FIG. 7, guide pin insertion holes c are formed at one sides of light input holes formed in the side of a rectangular groove of the optical PCB, into which the optical connection block 73 is inserted. When the optical connection block 73 is inserted into the rectangular groove of the optical PCB 71, the guide pins 72a of the optical connection block 73 are inserted into the guide pin insertion holes c. Accordingly, the optical connection block 73 is aligned with the waveguides of the optical PCB 71.

The optical connection block 73 has the guide pins 72b disposed in the top surface thereof. The guide pins 72b are disposed at positions corresponding to guide pin insertion holes b formed in spacers arranged on the bottom side of the heat spreader 74 having the same structure as that of the heat spreader shown in FIG. 6. The guide pins 72b are inserted into the guide pin insertion holes b such that the active window of the active photo-electric element is aligned with the waveguide of the optical connection block. Electrical connection of the transceiver module 74 and the optical PCB 71 is made by solder balls 75. The solder balls 75 serve as paths of connecting electric signals and physically fix the transceiver module 74 to the optical PCB 71.

When the optical connection block 73, the optical PCB 71 and the transceiver module 74 are connected through the aforementioned method, the transceiver module 74 is not aligned by self-alignment of the solder balls 75 but by the guide pins 72b. Since passive alignment is made by the guide pins 72a and 72b, optical coupling loss between the active photo-electric element of the transceiver module 74 and the optical connection block 73 becomes less than 1 dB as low as that of a conventional optical connector.

FIG. 8 shows an architecture in which optical fiber or polymer waveguide arrays corresponding to optical transfer layers 82 are arranged in two layers in an optical PCB 81, waveguides of an optical connection block 83 are arranged in two layers, and active photo-electric elements 84 of a transceiver module are also arranged in two layers. Though FIG. 8 shows two layers, the layer is not limited in number.

The present invention proposes the optical connection block for optical coupling between the transceiver module for an optical PCB, in which active photo-electric element and other components to be integrated in the optical PCB having waveguides are packaged, and the waveguides of the optical PCB. According to the present invention, the transceiver module, the optical connection block, and the optical PCB in which the waveguides are arranged can be passively aligned.

As described above, the present invention can passively align the optical connection block, the optical PCB and the transceiver module for the optical PCB using the guide pins. Accordingly, efficiency of optical coupling between the optical connection block and the optical PCB or the transceiver module can be improved. Furthermore, the optical connection block, the optical PCB and the transceiver module can be assembled and aligned accurately and easily to simplify the manufacturing process and reduce manufacturing cost.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An architecture of connecting an optical PCB, a transceiver module for the optical PCB, and an optical connection block including waveguides that change the direction of optical signals by 90° for optical coupling between the optical PCB and transceiver module,
    wherein guide pins are disposed on a top surface and a side of the optical connection block and located spaced apart by a predetermined distance from the ends of the waveguides;
    wherein a rectangular groove is formed in the optical PCB having waveguides arranged therein, for inserting the optical connection block thereto;
    wherein first guide pin insertion holes are formed at one side of the ends of the waveguides exposed from the side of the rectangular groove such that the guide pins disposed on the side surface of the optical connection block can be inserted into the first guide pin insertion holes; and
    wherein second guide pin insertion holes are formed in spacers located at one side of an active photo-electric element of the transceiver module for the optical PCB such that the guide pins disposed on the top surface of the optical connection block can be inserted into the second guide pin insertion holes,
    whereby the guide pins are inserted into the first guide pin insertion holes and the second guide pin insertion holes to connect the optical PCB, the transceiver module and the optical connection block to one another.

2. The architecture as claimed in claim 1, wherein the optical connection block includes third guide pin insertion holes such that the guide pins can be combined with and separated from the optical connection block through the third guide pin insertion holes.

3. The architecture as claimed in claim 1, wherein there are at least two guide pins and first and second guide pin insertion holes.

4. The architecture as claimed in claim 1, wherein the guide pins have a pole shape selected from a group of cross sections of a circle, a square, a pentagon and a hexagon.

5. The architecture as claimed in claim 1, wherein optical fiber or polymer waveguides in the optical PCB, optical fiber or polymer waveguides in the optical connection block, and active photo-electric elements integrated in the transceiver module for the optical PCB are respectively arranged in at least two layers.

6. An architecture of connecting an optical connection block, an optical PCB, and a transceiver module for the optical PCB that includes a photo-electric element, converts electric signals into optical signals or converts received optical signals into electric signal, and transmits or receives optical signals in the direction of the optical PCB,
    wherein the transceiver module includes spacers respectively having guide pin insertion holes, which are formed at one sides of the photo-electric element, and the transceiver module is combined with the optical connection block for changing the direction of optical signals by 90° to couple the optical signals to the optical PCB using guide pins inserted into the guide pin insertion holes.

7. The architecture as claimed in claim 6, wherein optical fiber or polymer waveguides in the optical PCB, optical fiber or polymer waveguides in the optical connection block, and active photo-electric elements integrated in the transceiver module for the optical PCB are respectively arranged in at least two layers.

8. An architecture of connecting an optical PCB in which optical fiber or polymer waveguides are arranged, a transceiver module for the optical PCB, and an optical connection block using the optical PCB,
    wherein the optical PCB has a rectangular groove into which the optical connection block for changing the direction of optical signals by 90° to couple the optical signals to the optical PCB is inserted, guide pin insertion holes are formed at one sides of the ends of the waveguides exposed from the side of the rectangular groove, and the optical connection block is aligned with the optical PCB and fixed to the optical PCB using guide pins inserted into the guide pin insertion holes when the optical connection block is inserted into the rectangular groove.

9. The architecture as claimed in claim 8, wherein optical fiber or polymer waveguides in the optical PCB and optical fiber or polymer waveguides in the optical connection block are respectively arranged in at least two layers.

* * * * *